US007429730B2

(12) United States Patent
Peck

(10) Patent No.: US 7,429,730 B2

(45) Date of Patent: Sep. 30, 2008

(54) SIFT-MS INSTRUMENTS

(75) Inventor: Geoffrey Charles Peck, Christchurch (NZ)

(73) Assignee: Syft Technologies Limited, Middleton, Christchurch (NZ)

( * ) Notice: Subject to any disclaimer, the term of this patent is extended or adjusted under 35 U.S.C. 154(b) by 291 days.

(21) Appl. No.: 10/580,355

(22) PCT Filed: Nov. 24, 2004

(86) PCT No.: PCT/NZ2004/000297

§ 371 (c)(1), (2), (4) Date: May 23, 2006

(87) PCT Pub. No.: WO2005/052984

PCT Pub. Date: Jun. 9, 2005

(65) Prior Publication Data

US 2008/0078929 A1 Apr. 3, 2008

(30) Foreign Application Priority Data

Nov. 25, 2003 (NZ) ..................................... 528617
Feb. 14, 2004 (NZ) ..................................... 531103

(51) Int. Cl.
*B01D 59/44* (2006.01)
*H01J 49/00* (2006.01)

(52) U.S. Cl. ....................... 250/288; 250/287; 250/282; 250/285; 250/297; 250/281; 250/286; 250/292; 250/423 P; 250/396 R; 250/290

(58) Field of Classification Search ................. 250/288, 250/287, 282, 285, 297, 281, 286, 292, 423 P, 250/396 R, 290
See application file for complete search history.

(56) References Cited

U.S. PATENT DOCUMENTS 5,117,194 A 5/1992 Nakanishi et al.
5,202,563 A * 4/1993 Cotter et al. ................ 250/287
6,498,342 B1 * 12/2002 Clemmer .................... 250/287

FOREIGN PATENT DOCUMENTS

EP 237259 9/1987

* cited by examiner

*Primary Examiner*—Jack I. Berman
*Assistant Examiner*—Meenakshi S Sahu
(74) *Attorney, Agent, or Firm*—D. Peter Hochberg; Sean F. Mellino; Daniel J. Smola

(57) ABSTRACT

A SIFT or SIFDT apparatus in which the upstream quadrupole and the downstream quadrupole are housed within a single evacuated chamber with the upstream quadrupole being connected to the downstream quadrupole by a curved flow tube. In a preferred form the interior of the chamber is divided into sections by an electrostatic shield which shields the upstream quadrupole and source connection from the downstream quadrupole and detector.

13 Claims, 1 Drawing Sheet

SIFT-MS INSTRUMENTS

CROSS-REFERENCE TO RELATED APPLICATION

This application is a National Stage application of International Application No. PCT/NZ2004/000297, filed on Nov. 24, 2004, which claims priority of New Zealand application No. 528617 filed on Nov. 25, 2003, and New Zealand application No. 531103 filed on Feb. 12, 2004.

BACKGROUND OF THE INVENTION

1. Field of the Invention

In particular the invention relates to an instrument that utilizes selected ion flow tube (SIFT), or selected ion flow drift tube (SIFDT) technique which is a fast flow tube/ion swarm method for the study of positive or negative ions with atoms and molecules. A selected ion flow tube can either be a drift tube which has a potential gradient applied to it or a flow tube which has no gradient applied to it. In the following description, the general term flow tube is therefore intended to encompass both forms of technique, that is SIFT-MS and SIFDT-MS.

2. Description of the Prior Art

In SIFT and SIFDT apparatus, the ions are created in an ion source which is external to the flow tube. The ions are then extracted from the ion source by a quadrupole mass filter which acts on the incident ion beam to create a pure species of ion beam (precursor). An electrostatic lens is then used to focus the ion beam which is injected into one end of a flow tube or drift tube which has a flowing carrier gas, usually helium or a mixture of helium and argon or nitrogen. The carrier gas is prevented from entering the quadrupole mass filter by being injected into the flow tube through a venturi orifice in a direction away from the orifice. This enables the swarm of single ion species to be thermalised in a flow tube at the same temperature as the carrier gas flows along the flow tube and quickly establishes a laminar flow of gases through the flow tube. The flow tube or drift tube communicates via a downstream orifice with a downstream chamber housing a quadrupole mass spectrometer system where the ions are mass analyzed and counted.

This form of instrument requires a chamber for the upstream quadrupole mass filter which is connected by the flow tube to a separate generally substantially identical chamber in which the downstream quadrupole mass spectrometer is housed. To allow the quadrupole mass filters to operate effectively, the interiors of both the upstream and the downstream chambers are pressurized at a pressure generally of about $10^{-6}$ Torr which is created by individual pumps. The pressure in the flow tube is generally much greater than the pressure in the chambers and generally is in the order of 0.5 to 1.0 Torr.

Because of the requirement of having separate chambers and because of the comparatively substantial size and capacity of the two pumps, a SIFT-MS or a SIFDT-MS instrument is of a substantial size. In addition because of the type of the pumps needed, considerable noise can be created when the instrument is operating. If the instrument is to be made at all portable, it is highly desirable that the instrument including the pumps be housed within a suitably small structure and because of the size and capacity of the pumps it is necessary that considerable attention also be given to adequate sound deadening.

SUMMARY OF THE INVENTION

Accordingly in one form the invention comprises an instrument for the analysis of volatile organic compounds including a downstream quadrupole mass filter and an upstream quadrupole mass filter housed within an evacuated chamber, and a curved flow tube connecting the upstream quadrupole mass filter to the downstream quadrupole mass filter.

It is an object of this invention to provide an improved instrument for analysis of volatile organic chemicals and which has a flow tube which utilizes SIFT MS or SIFDT MS technique.

It is a further object of this invention to provide a SIFT MS or SIFDT MS instrument which can be more transportable than previously known instruments and in which the size and combined weight of the various components of the instruments, and in particularly the high pressure pumps, can be downsized from that previously known.

Preferably the instrument includes an apparatus associated with the chamber and connectable to an ion source to direct ions from the ion source to the upstream quadrupole mass filter to extract ions to create a precursor ion beam, a lens to focus the ion beam and to inject the beam into the first end of the curved flow tube, an apparatus to enable a stream of non-reactive carrier gas to pass through the flow tube, injection apparatus through which the sample of the volatile organic compounds may be injected into the flow tube to react with the extracted ions, an apparatus to connect the second end of the flow tube to the downstream quadrupole mass filter through which the sample of charged ions are directed to a detector device.

Preferably an electrostatic shield is located in the chamber to shield the downstream quadrupole mass filter and detector from the upstream quadrupole mass filter and source introduction.

Preferably the non-reactive carrier gas is helium.

Preferably the non-reactive gas comprises a mixture of helium and other non-reactive gases.

Preferably the flow tube is pressurized at a higher pressure than that of the interior of the chamber.

Preferably the flow tube acts as a drift tube and has a potential gradient applied to it.

Preferably the flow tube acts as a flow tube and has no potential gradient applied to it.

Preferably a vacuum pump is utilized to ensure the non-reactive carrier gas will pass through the flow tube.

Preferably the injection of the non reactive gas into the flow tube is effected through a venturi orifice.

Preferably the curved flow tube and venturi orifice are constructed to provide a laminar flow of the gas-ion mixture through the flow tube.

In another aspect the instrument for the analysis of volatile organic compounds includes a downstream quadrupole mass filter and an upstream quadrupole mass filter housed within an evacuated chamber, the interior of the chamber being divided into sections by an electrostatic screen to shield the downstream quadrupole mass filter and the detector from the upstream quadrupole mass filter and source introduction, and a flow tube comprising a straight tube and two bends connecting the upstream quadrupole mass filter to the downstream quadrupole mass filter.

Preferably the interior of the chamber is evacuated by a pumping system that will maintain the internal elements within appropriate operating margins.

DETAILED DESCRIPTION OF THE PREFERRED EMBODIMENT

Figure 1:
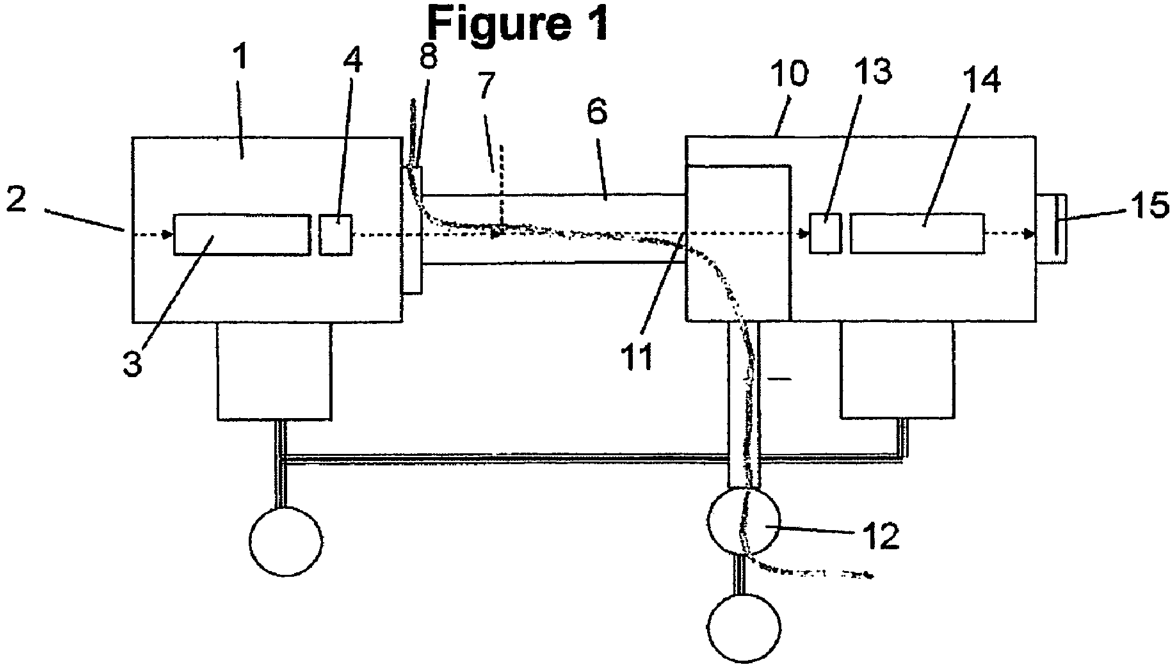
FIG. 1 is a schematic diagram of a known form of SIFT-MS or SIFDT-MS instrument.

As illustrated in FIG. 1, a known form of SIFT-MS or SIFDT-MS instrument may comprise an upstream chamber 1 to which an ion source 2 is connected. The upstream chamber houses a quadrupole mass filter 3 through which the ion stream is passed. The upstream chamber is held at a pressure, generally $10^{-6}$ Torr to enable correct operation of the quadrupole 3. The ion stream is focused by the lens 4 before it passes through an ion injection orifice located as part of the venturi plate 8, to enter the flow tube 6.

The flow tube or flow drift tube 6 is generally held at a pressure of approximately 0.5 to 1.0 Torr and a stream of a non-reactive carrier gas or gas mixture, typically helium is injected at 8 into the flow tube in a manner that a venturi effect is obtained to prevent the ion stream from the chamber 1 and the non-reactive gas from escaping back into the upstream chamber. Additional non-reactive carrier gas or mixture of non-reactive gases, can be injected at additional points along tube 6.

The sample of the volatile organic compound (VOC) is injected at 7 into the flow tube and reacts with the incident beam of ions, the result of which is a transfer of ions to the VOC. The charged VOCs then enter the downstream chamber through a small injection orifice 11 with the downstream chamber 10 generally held at a similar pressure ($10^{-6}$ Torr) to the upstream chamber 1. As in the case of the upstream chamber, the downstream chamber 10 is normally evacuated by means of a turbo pump 12 or similar. The downstream chamber includes a set of lenses 13 and a quadrupole mass filter 14 with a detector device 15 by which the masses of the incident VOCs and precursor ions are measured. Backing pumps are shown at 16 and these allow the chambers 1 and 10 to be evacuated sufficiently to allow turbo pumps 12 to maintain the desired chamber pressure.

In the following description and claims the term "flow tube" is intended to include both a flow tube and a flow drift tube.

Figure 2:
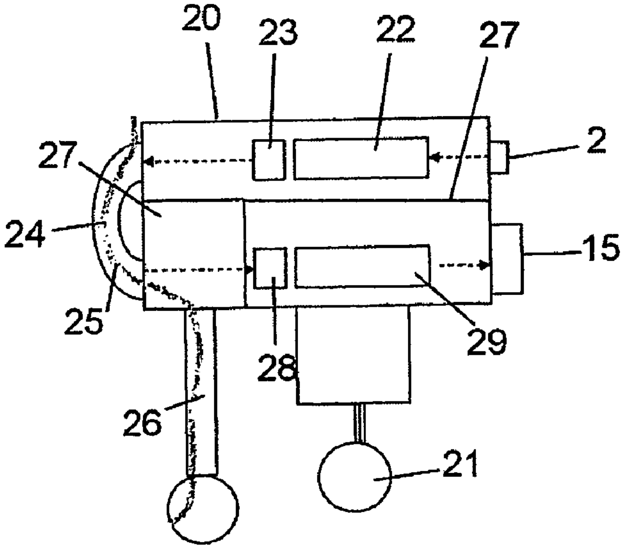
FIG. 2 is a schematic diagram of the improved form of SIFT-MS or SIFDT-MS instrument according to the present invention.

The improved SIFT-MS or SIFDT-MS instrument is illustrated diagrammatically in FIG. 2. As illustrated, the upstream chamber 1 and the downstream chamber 10 of FIG. 1 are dispensed with and a single combined chamber 20 is provided which is evacuated by a pumping system 21 preferably maintaining a pressure of $10^{-5}$ Torr or lower. The chamber 20 includes an upstream quadrupole 22 and lens 23 to extract the ions from the ion source 2 with the extracted ions being focused through the lens and injected into a flow tube or flow drift tube 24 through which a stream of non-reactive carrier gas is passed. The flow tube or flow drift tube 24 is maintained at an appropriate pressure, typically 0.5 Torr by a pump 26. The flow tube or flow drift tube 24 instead of being an essentially straight tube which connected an upstream chamber to a downstream chamber as in the case of the prior art instrument illustrated in FIG. 1, in the improvement provided by this invention, the flow tube or flow drift tube is curved as illustrated. The sample VOCs are injected into the flow tube or flow drift tube 24 to react with the beam of ions which then enters the chamber 20 through an ion sampling orifice 25 where it is focused by the lens 28 into the quadrupole mass filter 29 which acts as a mass selector prior to analysis by the detector 15.

Depending on the source of ions and the construction of the chamber various undesired particles may enter the chamber and depending upon the type of particles it can be necessary to insert an electrostatic shield in the chamber to block these particles from reaching the detector. As illustrated in FIG. 2, an electrostatic shield 27 may be located within the chamber 20 to electrostatically separate the quadrupole mass filter 22 and lens 23 from the lens 28 and quadrupole mass filter 29. The purpose of the shield is to prevent both charged and uncharged particles from creating interferences between the ion source 2 and the quadrupole mass filters 29, 22 and the detector 15. It is to be understood that purpose of the shield is to act as a barrier which is impermeable to ions or energetic particles and the term electrostatic shield is therefore intended to encompass all forms of shields or barriers capable of preventing interference between the ion source and the quadrupole filters and detector.

The pump 21 must be chosen to ensure both sides of the shielded chamber are adequately pumped to allow the quadrupole mass filters 22 and 29 and also the detector to operate within their required ranges. It will be understood that if the shield is constructed from a metal grid or gauze, then the pumping will be arranged to take into account the possible permeability of the shields. Backing pumps are shown at 26 and these allow the chamber 20 to be evacuated sufficiently to allow the pumping system 21 to maintain the desired chamber pressure.

As in the case of the instrument illustrated in FIG. 1, a non-reactive gas such as helium and the precursor ions are injected into one end of the flow tube and flow along the tube, the flow being created by the action of the vacuum pump. It is therefore possible to maintain laminar flow after injection of the sample VOCs. The non-reactive gas may also be a mixture of helium and argon or nitrogen or a mixture of helium and other suitable non-reactive gas or gases.

Because of the improvements in the instrument brought about by the present invention, it is possible to make the whole instrument considerably physically smaller with less componentry that that previously required. This provides significant savings in the cost in the manufacture of the instrument. In addition, because only a single pump is used, less electrical power is required and less noise is generated. This reduces the considerable amount of sound insulation that was previously required. It is to be understood this is a major advantage when constructing the instrument as a portable instrument because this will result in a reduction of the number of component parts and consequently in the size of the machine and in the weight of the machine.

Having described the preferred embodiments of the invention it will be apparent to those skilled in the art that various changes and alterations can be made to the embodiments and yet still come within the general concept of the invention. All such changes and alterations are intended to be included in the scope of this specification.

The invention claimed is:

1. An instrument for the analysis of a sample of volatile organic compounds, said instrument comprising:

an evacuated chamber;

a downstream quadrupole mass filter and an upstream quadrupole mass filter housed within said evacuated chamber; and a curved flow tube having a first end and a second end, said tube connecting the upstream quadrupole mass filter to the downstream quadrupole mass filter.

2. The instrument according to claim 1, further comprising:

an apparatus associated with the chamber and connectable to an ion source for directing ions from the ion source to the upstream quadrupole mass filter, said upstream quadrupole mass filter extracting ions to create a precursor ion beam;

a lens for focusing the ion beam and for injecting the beam into the first end of the curved flow tube;

an apparatus for enabling a stream of non-reactive carrier gas to pass through the flow tube;

an injection apparatus for injecting the sample of volatile compounds into the flow tube for reacting with the extracted ions; and a connection apparatus for connecting the second end of the flow tube to the downstream quadrupole mass filter, and for directing the sample of charged ions to a detector device.

3. The instrument according to claim 2, further comprising an electrostatic shield located in the chamber for shielding the downstream quadrupole mass filter and detector from the upstream quadrupole mass filter and source introduction.

4. The instrument according to claim 2, wherein the non-reactive carrier gas is helium.

5. The instrument according to claim 2, wherein the non-reactive gas comprises a mixture of helium and other non-reactive gases.

6. The instrument according to claim 1, wherein the flow tube is pressurized at a higher pressure than the pressure of the interior of the chamber.

7. The instrument according to claim 1, wherein the flow tube acts as a drift tube and has a potential gradient applied to said flow tube.

8. The instrument according to claim 1, wherein the flow tube acts as a flow tube and has no potential gradient applied to said flow tube.

9. The instrument according to claim 2, wherein a vacuum pump is utilized to ensure the non-reactive carrier gas will pass through the flow tube.

10. The instrument according to claim 2, further comprising a venture orifice for effecting the injection of the non reactive gas into the flow tube.

11. The instrument according to claim 10, wherein the curved flow tube and venturi orifice are constructed to provide a laminar flow of the gas-ion mixture through the flow tube.

12. An instrument for the analysis of volatile organic compounds, said instrument comprising:

an evacuated chamber;

a downstream quadrupole mass filter and a detector, and an upstream quadrupole mass filter and a source introduction, housed within said evacuated chamber;

an electrostatic screen for dividing the interior of said chamber into sections to shield the downstream quadrupole mass filter and the detector from the upstream quadrupole mass filter and source introduction; and a flow tube comprising a straight tube and two bends connecting the upstream quadrupole mass filter to the downstream quadrupole mass filter.

13. The instrument according to claim 1, further comprising a pumping system for evacuating the interior of the chamber for maintaining the internal elements within appropriate operating margins.

* * * * *

UNITED STATES PATENT AND TRADEMARK OFFICE

CERTIFICATE OF CORRECTION

PATENT NO. : 7,429,730 B2
APPLICATION NO. : 10/580355
DATED : September 30, 2008
INVENTOR(S) : Geoffrey Charles Peck It is certified that error appears in the above-identified patent and that said Letters Patent is hereby corrected as shown below:

On the Title Page, Item (30)
At item (30) - Foreign Application Priority Data on the cover page, change “Feb. 14, 2004” to read - Feb. 12, 2004 -.

Signed and Sealed this

Seventeenth Day of February, 2009

JOHN DOLL
*Acting Director of the United States Patent and Trademark Office*